US012325612B2

(12) United States Patent
Lung et al.

(10) Patent No.: US 12,325,612 B2
(45) Date of Patent: Jun. 10, 2025

(54) CABLE GUIDING ASSEMBLY

(71) Applicant: REXON INDUSTRIAL CORP., LTD., Taichung (TW)

(72) Inventors: Yu-Chuan Lung, Taichung (TW); Hung-Jung Chiang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 291 days.

(21) Appl. No.: 18/193,882

(22) Filed: Mar. 31, 2023

(65) Prior Publication Data

US 2024/0327176 A1 Oct. 3, 2024

(51) Int. Cl.
*B66D 1/38* (2006.01)
*B66D 1/36* (2006.01)

(52) U.S. Cl.
CPC . *B66D 1/38* (2013.01); *B66D 1/36* (2013.01)

(58) Field of Classification Search
CPC .................................... B66D 1/38; B66D 1/36
See application file for complete search history.

(56) References Cited

U.S. PATENT DOCUMENTS

| | | | | |
|---|---|---|---|---|
| 5,330,122 A * | 7/1994 | Wood | B66D 1/38 | 242/397.3 |
| 5,663,541 A * | 9/1997 | McGregor, II | H01H 1/20 | 200/17 R |
| 8,267,379 B2 * | 9/2012 | Yang | B66D 3/006 | 254/323 |
| 9,248,999 B2 * | 2/2016 | Xydias | B66D 1/38 | |
| 9,440,825 B2 * | 9/2016 | Xydias | B66D 1/38 | |
| 2015/0076266 A1 * | 3/2015 | Crawford | B66D 1/38 | 242/157.1 |
| 2024/0308819 A1 * | 9/2024 | Lung | B66D 1/38 | |

FOREIGN PATENT DOCUMENTS

| | | | | |
|---|---|---|---|---|
| CN | 107473116 A | * 12/2017 | B66D 1/38 |
| CN | 110271981 A | 9/2019 | |
| CN | 209740577 U | 12/2019 | |

OTHER PUBLICATIONS

Search Report appended to an Office Action issued to Taiwanese counterpart application No. 111100728 by the TIPO on Aug. 2, 2022, with an English translation thereof.

* cited by examiner

*Primary Examiner* — Sang K Kim
*Assistant Examiner* — Nathaniel L Adams
(74) *Attorney, Agent, or Firm* — Fish & Richardson P.C.

(57) ABSTRACT

A cable guiding assembly includes a supporting frame, a roller unit, a connecting unit, and a cable guide device. The roller unit includes upper and lower rollers rotatably mounted in the supporting frame and defining a cable space therebetween for extension of a cable therethrough. The connecting unit includes left and right swing arms pivotably connected to the supporting frame, and an elongated rod extending and mounted between the left and right swing arms. The cable guide device is mounted to and slidable along the elongated rod, and has a left-right channel for extension of the elongated rod therethrough, and a front-rear channel extending through the cable guide device and for the cable to extend therethrough. Pivot movement of the left and right swing arms drives the cable guide device to move between an deployed position and a retracted position.

10 Claims, 9 Drawing Sheets

CABLE GUIDING ASSEMBLY

FIELD

The disclosure relates to a cable guiding assembly, and more particularly to a cable guiding assembly for extension of a cable therethrough.

BACKGROUND

A winch for winding and unwinding a cable is mounted at a front side of a vehicle to pull the vehicle in case where the vehicle is trapped or stuck. Generally, a conventional cable guiding assembly is mounted in front of the winch for guiding the cable to be smoothly wound around and unwound from a reel of the winch to thereby preventing the cable from jumping off the reel.

The conventional cable guiding assembly includes a supporting frame connected fixedly to the winch, an elongated rod extending in a left-right direction and mounted to the supporting frame, and a cable guide device mounted to and slidable along the elongated rod. The cable guide device has a front-rear through hole for the cable to extend therethrough so the cable is guided to be wound around or unwound from the reel of the winch.

However, the conventional cable guiding assembly is disposed in front of the winch and is likely to be damaged when not in use. In addition, it is troublesome to remove the conventional cable guiding assembly from the vehicle if wanting to keep it from being damaged when not in use.

SUMMARY

Therefore, an object of the disclosure is to provide a cable guiding assembly that can alleviate at least one of the drawbacks of the prior art. According to the disclosure, a cable guiding assembly adapted to be mounted to a winch and for extension of a cable therethrough is provided. The cable guiding assembly includes a supporting frame, a roller unit, a connecting unit, and a cable guide device. The roller unit includes an upper roller and a lower roller that are rotatably mounted in the supporting frame, that extend in a left-right direction, that are spaced apart from each other, and that define a cable space therebetween adapted for extension of the cable therethrough. The connecting unit includes a left swing arm and a right swing arm that are spaced apart from each other in the left-right direction and that are pivotably connected to the supporting frame, and an elongated rod that extends in the left-right direction and that is mounted between the left swing arm and the right swing arm. The cable guide device is mounted to and slidable along the elongated rod, and has a left-right channel that extends in the left-right direction for extension of the elongated rod therethrough, and a front-rear channel that extends through the cable guide device in a front-rear direction transverse to the left-right direction and that is adapted for the cable to extend therethrough. Pivot movement of the left swing arm and the right swing arm drives the cable guide device to move between a deployed position, where the cable guide device is disposed in front of the supporting frame, and a retracted position, where the cable guide device is disposed on top of the supporting frame.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
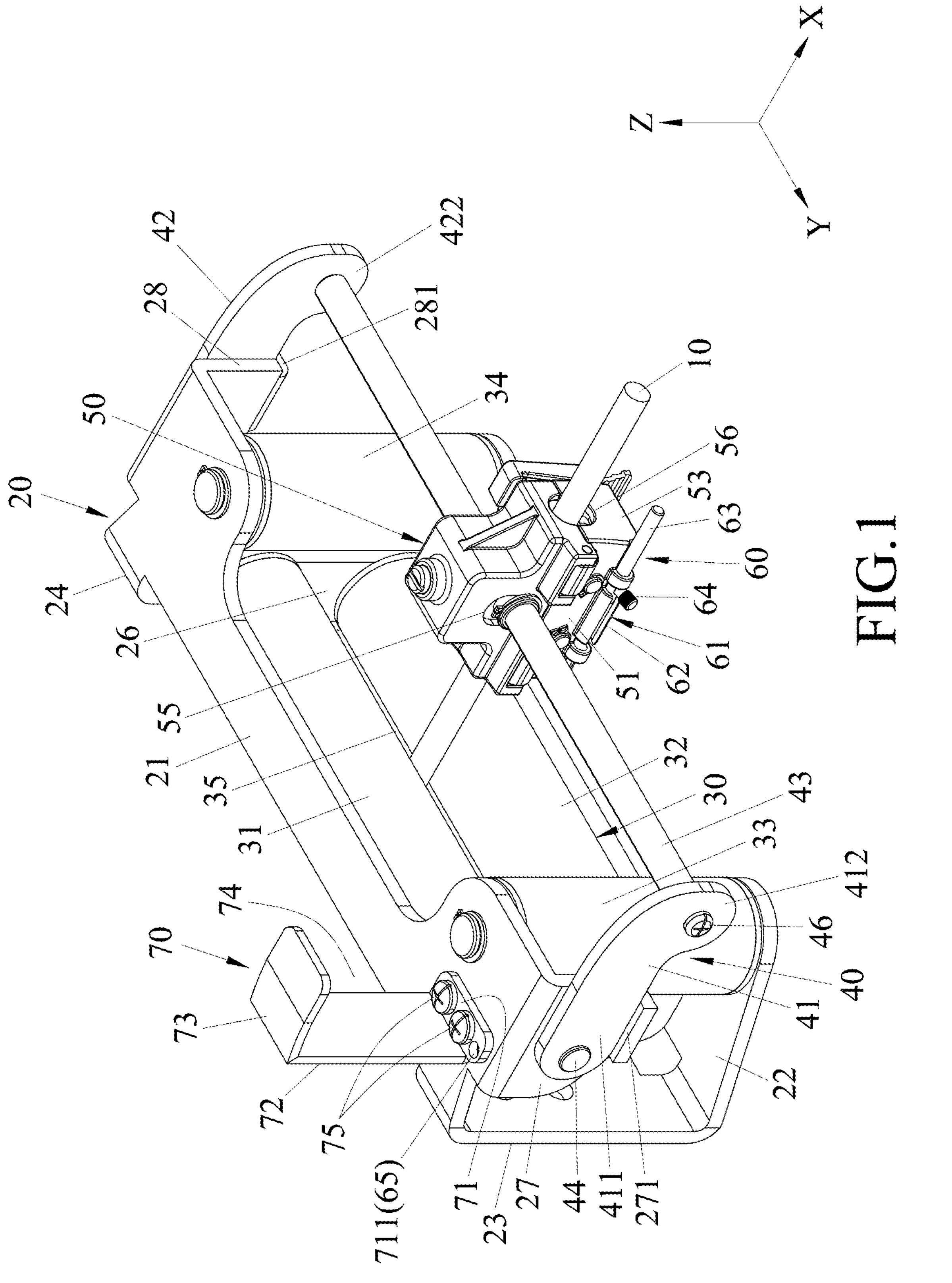
FIG. 1 is a perspective view of a cable guiding assembly of an embodiment according to the present disclosure, illustrating a cable guide device of the embodiment being at a deployed position.
Figure 2:
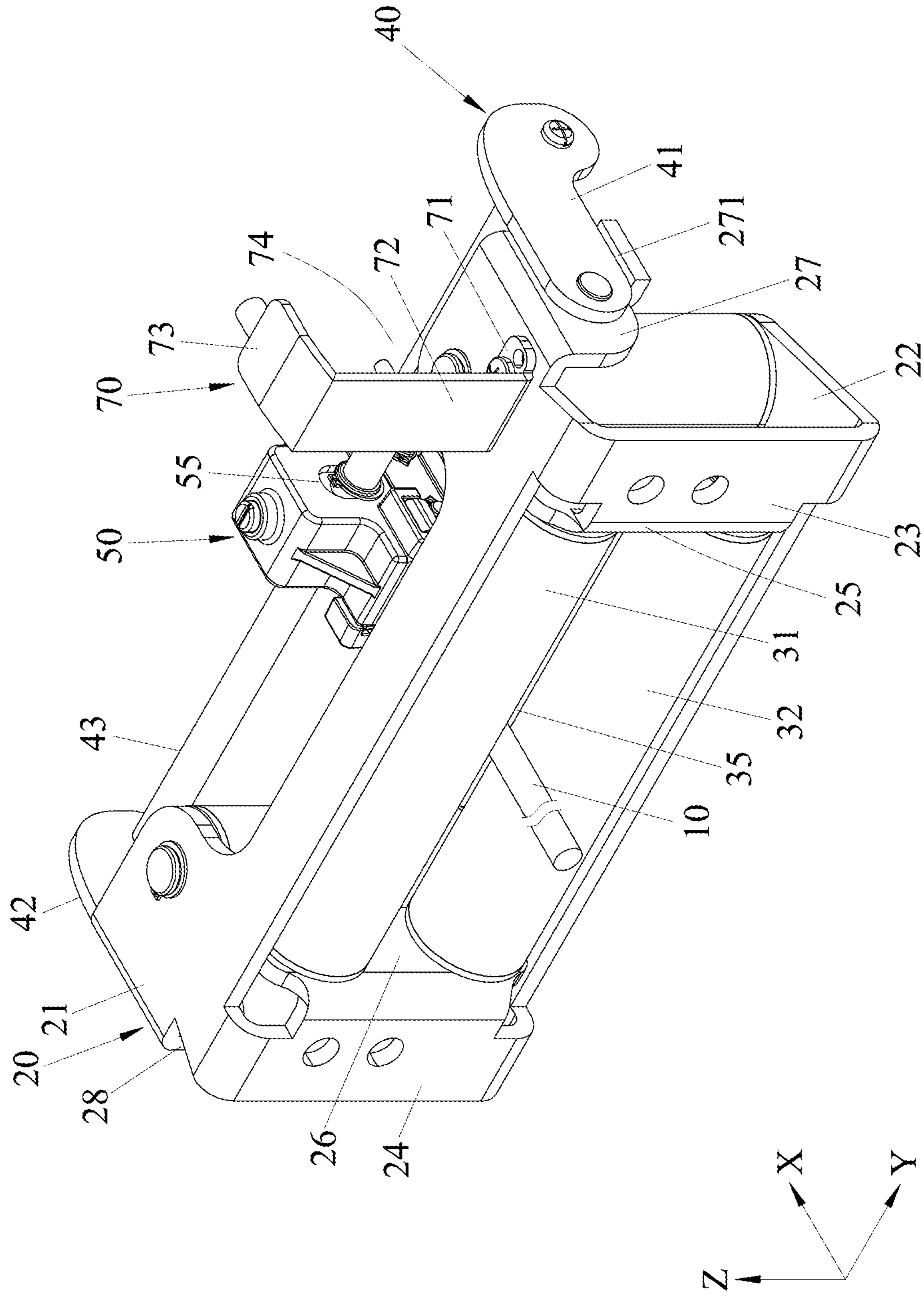
FIG. 2 is a perspective view of the embodiment seen from another view of angle different from FIG. 1.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently e.g., rotated 90 degrees or at other orientations and the spatially relative terms used herein may be interpreted accordingly.

Referring to FIGS. 1 to 4, a cable guiding assembly of an embodiment according to the present disclosure is adapted to be mounted to a winch for extension of a cable 10 therethrough. The cable guiding assembly includes a supporting frame 20, a roller unit 30, a connecting unit 40, a cable guide device 50, a locking unit 60, and a retaining seat 70.

The supporting frame 20 includes an upper plate 21, a lower plate 22, a left rear plate 23, a right rear plate 24, a left mounting plate 25, a right mounting plate 26, a left side plate 27, and a right side plate 28. The upper plate 21 and the lower plate 22 are elongated in a left-right direction (Y) and are spaced apart from each other in an up-down direction (Z) that is transverse to the left-right direction (Y). The left rear plate 23 and the right rear plate 24 interconnect the upper plate 21 and the lower plate 22 and are spaced apart from each other in the left-right direction (Y). The left mounting plate 25 and the right mounting plate 26 extend respectively and forwardly from the left rear plate 23 and the right rear plate 24. The left side plate 27 and the right side plate 28 extend respectively and downwardly from left and right ends of the upper plate 21. The left side plate 27 has a left block 271 distal from the upper plate 21 and bent leftwardly. The right side plate 28 has a right block 281 distal from the upper plate 21 and bent rightwardly.

In this embodiment, the cable guiding assembly is connected to the winch by a plurality of bolts (not shown) and the present disclosure is not limited in this respect.

The roller unit 30 includes an upper roller 31, a lower roller 32, a left roller 33, and a right roller 34. The upper roller 31 and the lower roller 32 are rotatably mounted in the supporting frame 20, extend in the left-right direction (Y), are spaced apart from each other, and define a cable space 35 therebetween adapted for extension of the cable 10 therethrough. The left roller 33 and the right roller 34 extend in the up-down direction (Z), are mounted between the upper plate 21 and the lower plate 22, and are spaced apart from each other in the left-right direction (Y). In this embodiment, the left roller 33 and the right roller 34 are disposed in front of the upper roller 31 and the lower roller 32.

By virtue of the upper roller 31 and the lower roller 32, a moving range of the cable 10 in the up-down direction (Z) is limited in the cable space 35 when the cable 10 is wound around and unwound from a reel of the winch so the cable 10 may be prevented from jumping off the reel of the winch. Additionally, the left roller 33 and the right roller 34 also prevent the cable 10 from jumping out of the supporting frame 20 and are capable of increasing structural strength of the cable guiding assembly.

The connecting unit 40 includes a left swing arm 41, a right swing arm 41, and an elongated rod 43. The left swing arm 41 and the right swing arm 42 are spaced apart from each other in the left-right direction (Y) and are pivotably connected to the supporting frame 20. The elongated rod 43 extends in the left-right direction (Y), and is mounted between the left swing arm 41 and the right swing arm 42.

The left swing arm 41 is generally L-shaped, and includes a left pivot portion 411 pivoted to the left side plate 27, and a left free portion 412 extending from the left pivot portion 411 forwardly and downwardly.

The right swing arm 42 is generally L-shaped, and includes a right pivot portion 421 pivoted to the right side plate 28, and a right free portion 422 extending from the right pivot portion 421 forwardly and downwardly.

The elongated rod 43 is connected between the left free portion 412 and the right free portion 422.

Figure 3:
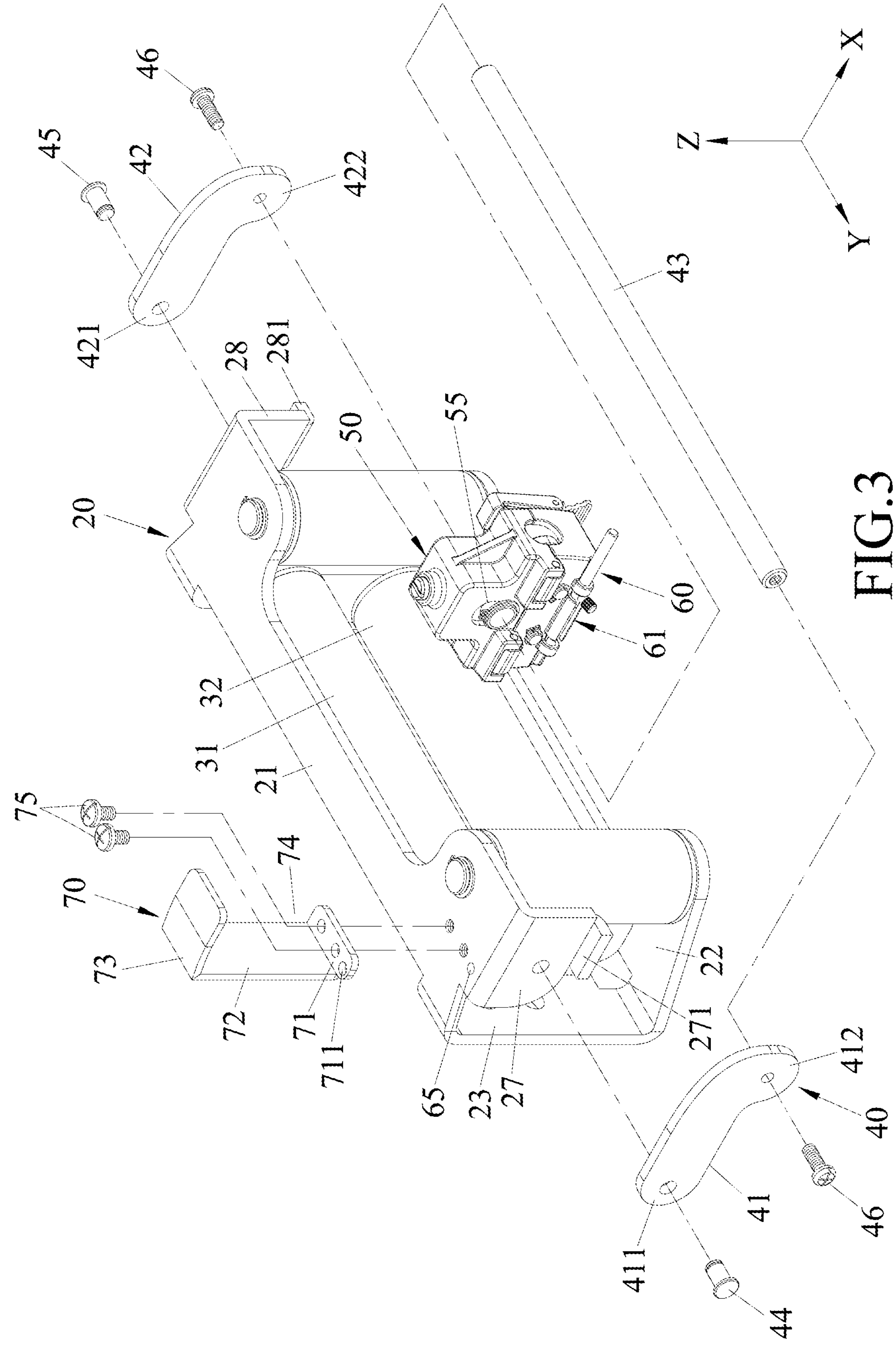
FIG. 3 is a partly exploded perspective view of the embodiment, illustrating a supporting frame, a roller unit, a connecting unit, a cable guide device, a locking unit, and a retaining seat of the embodiment.
Figure 4:
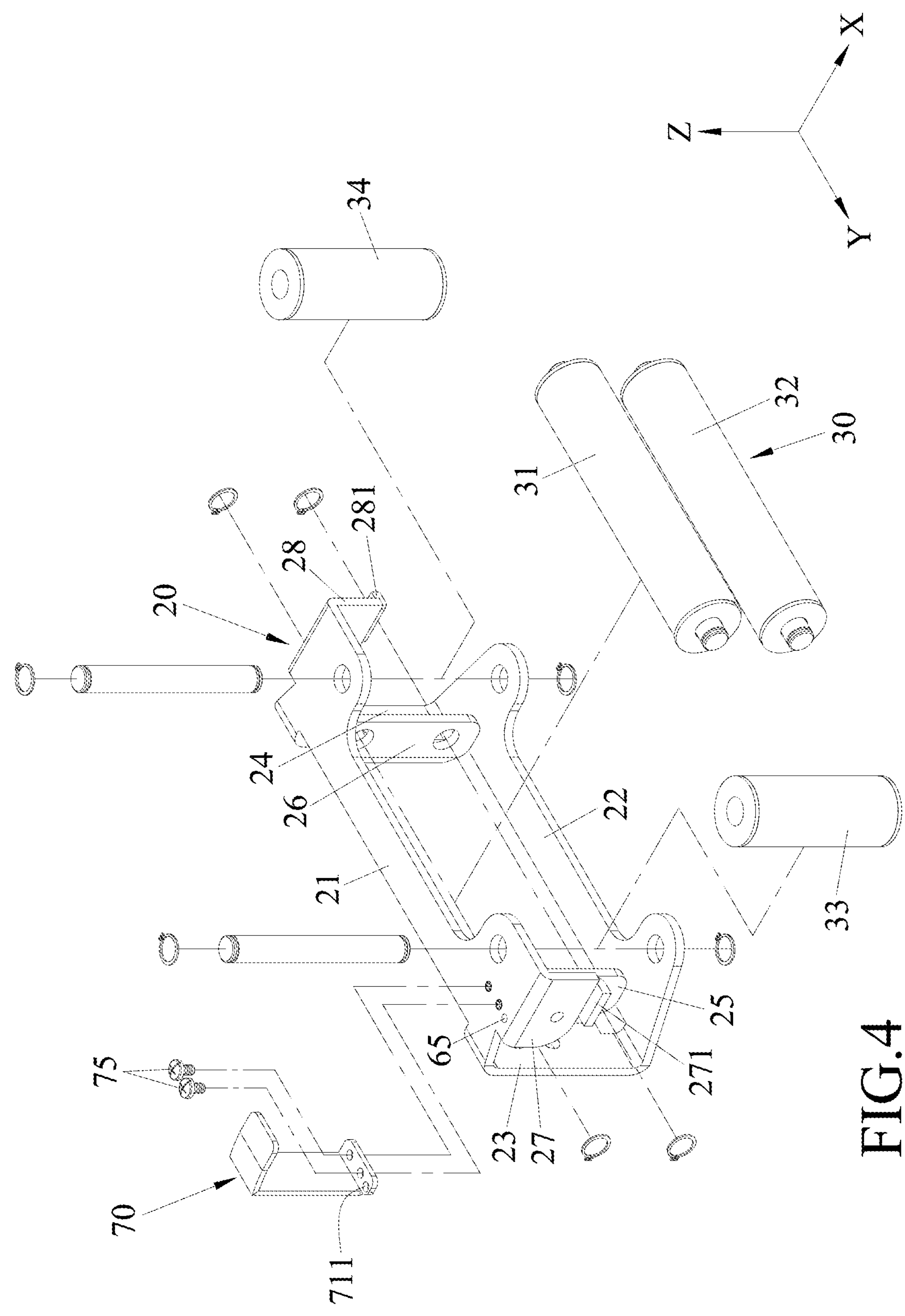
FIG. 4 is a partly exploded perspective view of the supporting frame, the roller unit, and the retaining seat of the embodiment.
Figure 5:
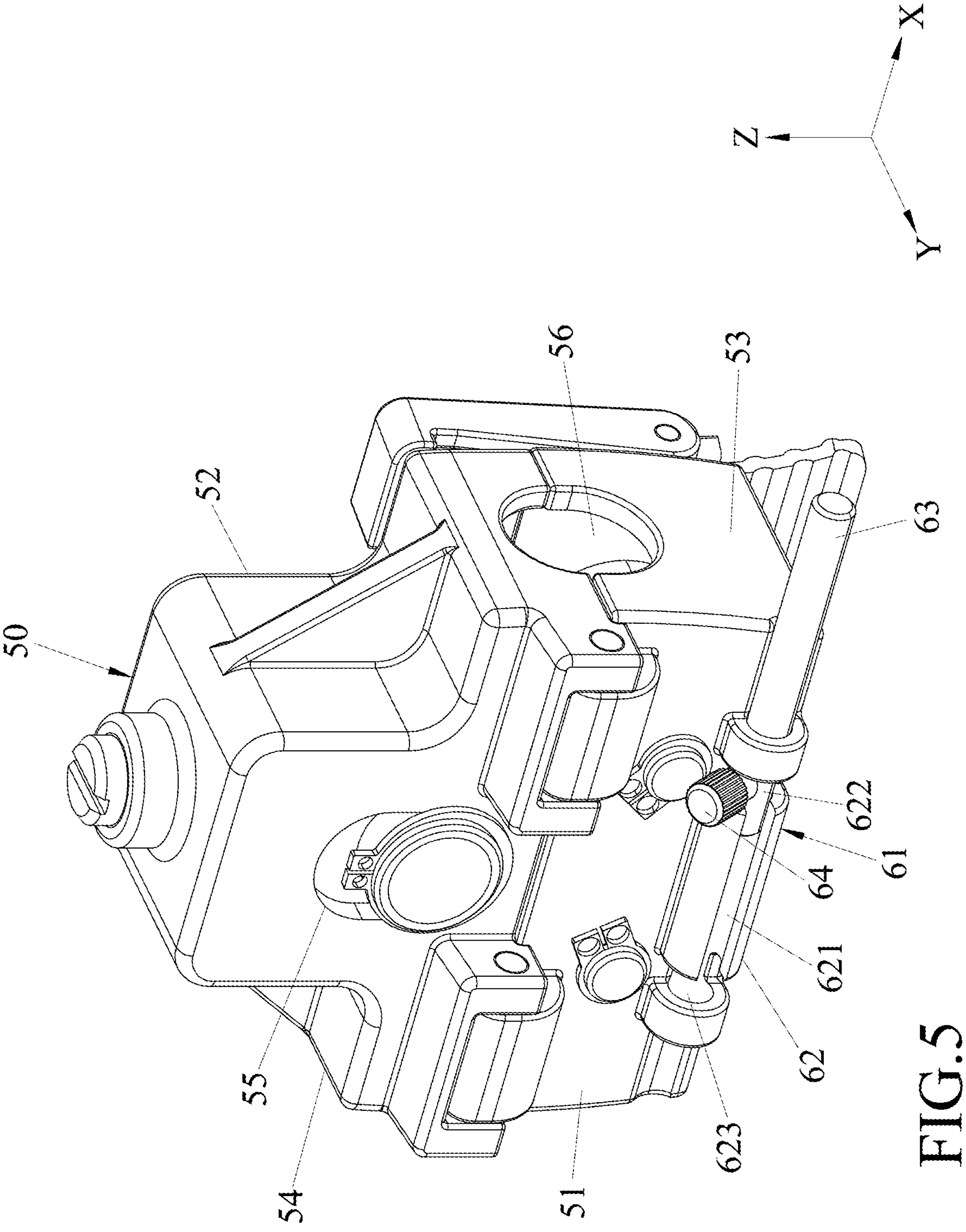
FIG. 5 is a perspective view of the cable guide device and a portion of the locking unit of the embodiment, illustrating a sliding bolt of the locking unit being movable relative to the cable guide device.

In this embodiment, as shown in FIG. 3, the connecting unit 40 further includes a left fastener 44 and a right fastener 45. The left fastener 44 extends through the left pivot portion 411 of the left swing arm 41 and the left side plate 27, and the right fastener 45 extends through the right pivot portion 421 of the right swing arm 42 and the right side plate 28, such that the left swing arm 41 and the right swing arm 42 are pivotably and respectively connected to the left side plate 27 and the right side plate 28. The left pivot fastener 44 and the right fastener 45 may be rivets, bolts or other equivalent members, as long as the left pivot portion 411 and the right pivot portion 421 are connected pivotably and respectively to the left side plate 27 and the right side plate 28.

In this embodiment, the elongated rod 43 has opposite ends that are respectively connected to the left free portion 412 and the right free portion 422 by two screws 46 extending respectively therethrough.

Referring to FIGS. 1, 3, 5 and 6, the cable guide device 50 is mounted to and slidable along the elongated rod 43, includes a left wall 51, a right wall 52, a front wall 53, and a rear wall 54, and has a left-right channel 55 and a front-rear channel 56.

The left-right channel 55 extends through the left wall 51 and the right wall 52 in the left-right direction (Y) for extension of the elongated rod 43 therethrough. The front-rear channel 56 extends through the front wall 53 and the rear wall 54 in a front-rear direction (X) transverse to the left-right direction (Y) and the up-down direction (Z), and is adapted for the cable 10 to extend therethrough. In this embodiment, a plurality of rollers (not shown) are mounted in the cable guide device 50 to clamp the cable 10 thereamong, so a bouncing movement of the cable 10 when being wound or unwound may be reduced.

Figure 7:
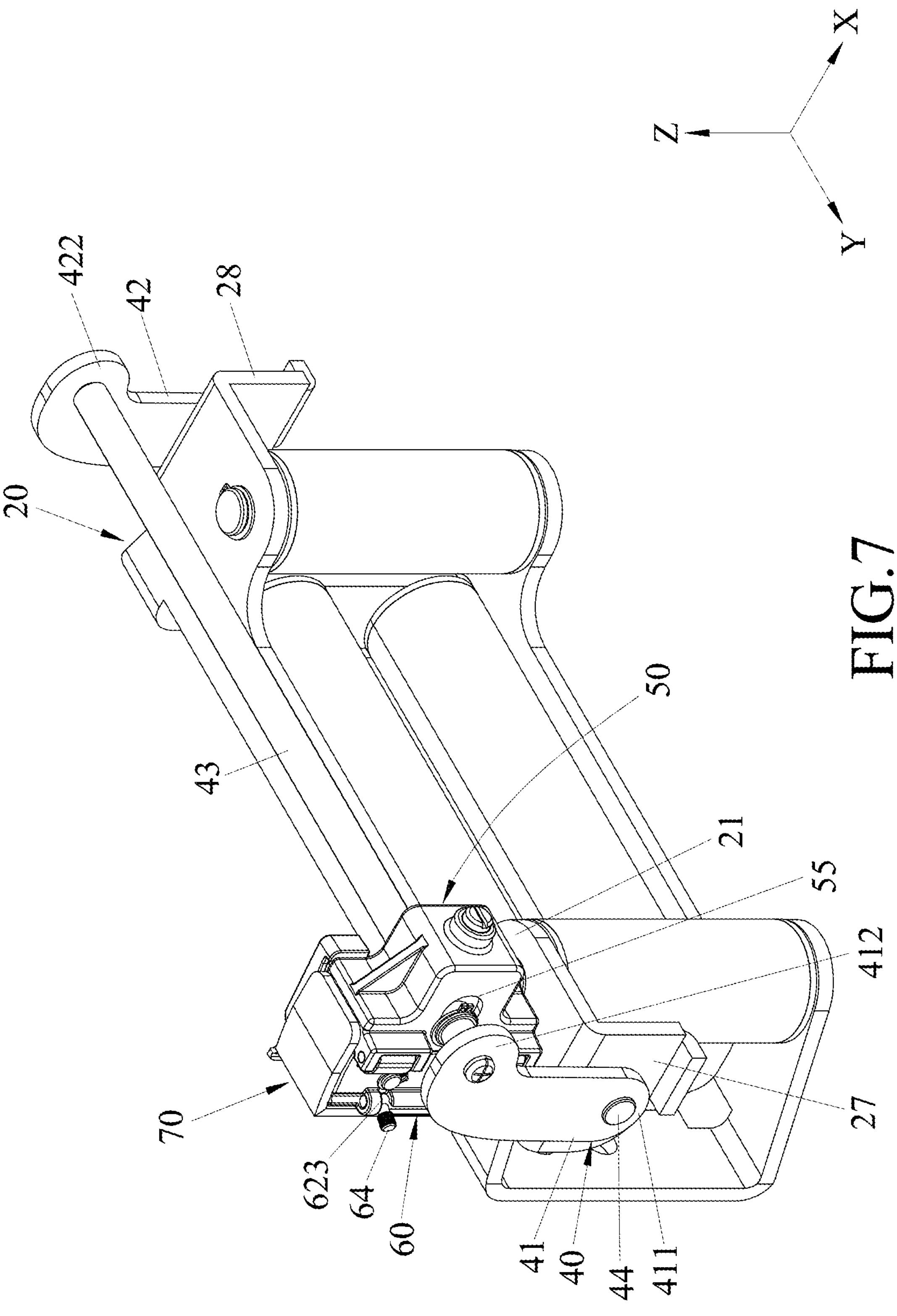
FIG. 7 is a perspective view similar to FIG. 1, illustrating the cable guide device being at a retracted position and the locking unit being in an unlocked state.
Figure 8:
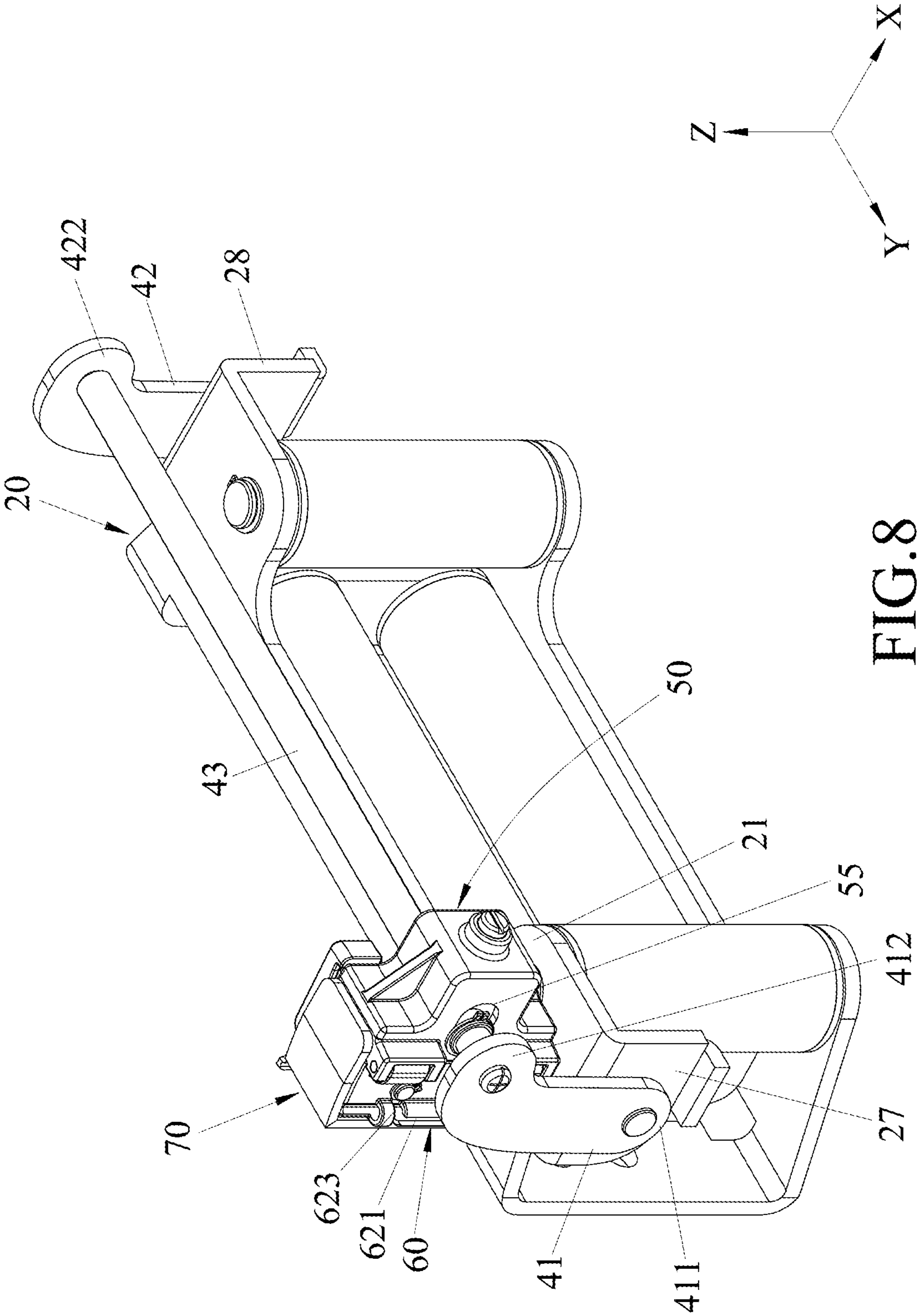
FIG. 8 is a perspective view similar to FIG. 7, but illustrating the locking unit being in a locked state.

Referring to FIGS. 1, 7, and 8, pivot movement of the left swing arm 41 and the right swing arm 42 drives the cable guide device 50 to move between a deployed position (see FIG. 1), where the cable guide device 50 is disposed in front of the supporting frame 20, and a retracted position (see FIGS. 7 and 8), where the cable guide device 50 is disposed on top of the supporting frame 20.

When the cable guide device 50 is at the deployed position, the cable 10 may be brought to extend through the front-rear channel 56 to extend through the cable space 35 defined between the upper roller 31 and the lower roller 32. By virtue of the winch, the cable 10 is pulled rearwardly to be wound around the reel of the winch.

Figure 9:
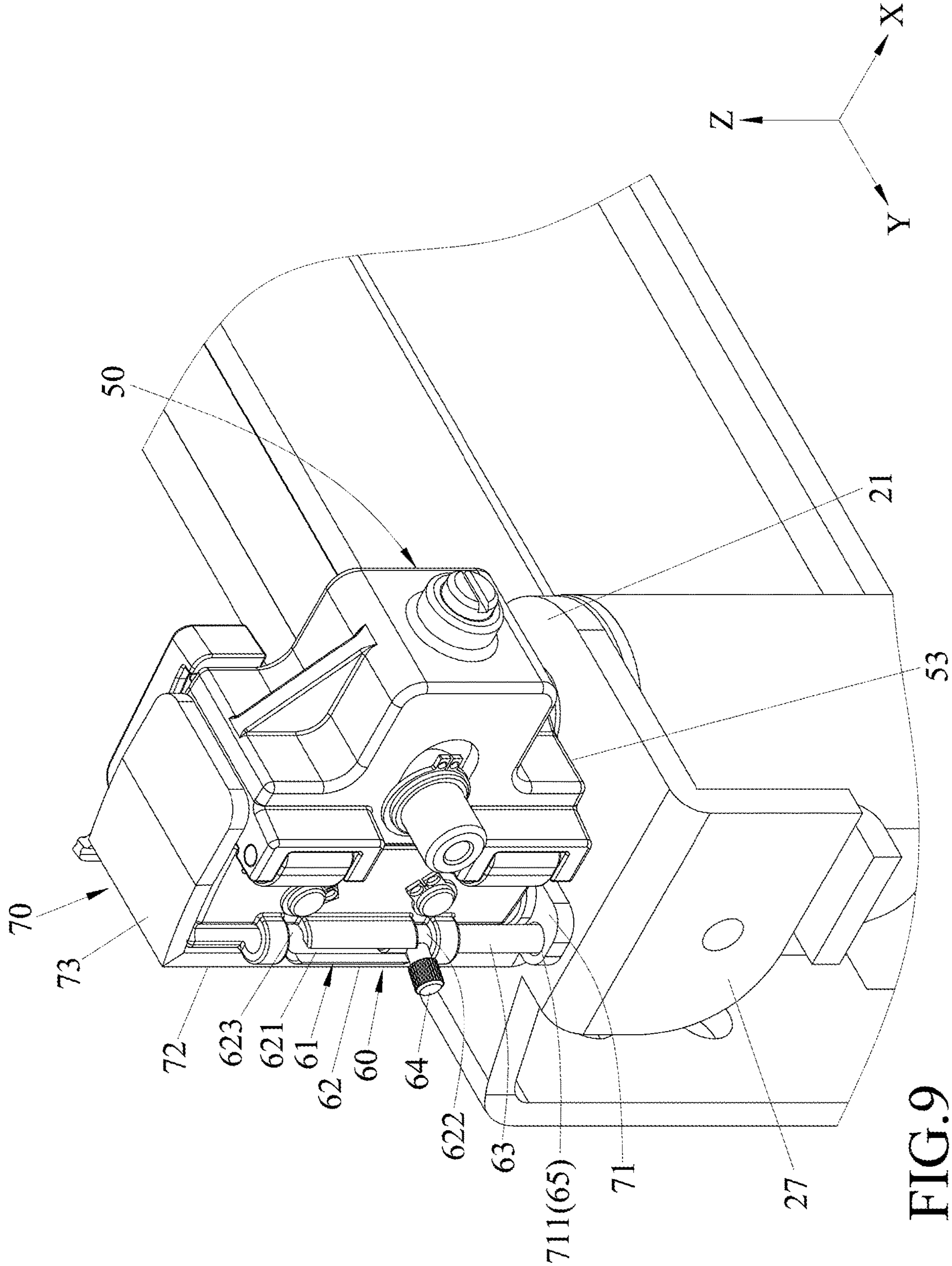
FIG. 9 is a fragmentary perspective view of FIG. 8, illustrating the sliding bolt engaging a latch hole of the locking unit.

Referring to FIGS. 7 to 9, when the cable guide device 50 is at the retracted position, the locking unit 60 is operable from an unlock state (see FIG. 7) to a lock state (see FIGS. 8 and 9) to detachably engage the supporting frame 20 so as to secure the cable guide device 50 at the retracted position.

Specifically, the locking unit 60 has a latch hole 65 formed in the upper plate 21 of the supporting frame 20 and a latch bolt 61 mounted to the left wall 51 of the cable guide device 50.

The latch bolt 61 engages removably the latch hole 65 when the cable guide device 50 is at the retracted position and when the locking unit 6 is converted to the lock state. In this embodiment, the latch bolt 61 includes a fastener seat 62 that is mounted on the left wall 51 of the cable guide device 50, a sliding bolt 63 that is mounted to the fastener seat 62 and that is slidable relative to the cable guide device 50, and a grip member 64 that is connected fixedly to the sliding bolt 63 and that protrudes outwardly of the fastener seat 62. The fastener seat 62 has a guide groove 621, a front positioning groove 622, and a rear positioning groove 623. The guide groove 621 extends between the front wall 53 and the rear wall 54. The front positioning groove 622 and the rear positioning groove 623 extend from and perpendicular to the guide groove 621, and communicate respectively with two ends of the guide groove 621 that are respectively adjacent to the front wall 53 and the rear wall 54. The grip member 64 is operable to move the sliding bolt 63 along the guide groove 621, and engages a selected one of the front positioning groove 622 and the rear positioning groove 623, such that the locking unit 60 is moved to one of the lock state and the unlock state. When the locking unit 6 is in the unlock state, the sliding bolt 63 is entirely disposed between the front wall 53 and the rear wall 54. As shown in FIGS. 7 and 8, when the cable guide device 50 is at the retracted position, the sliding bolt 63 is slidable from the unlock state to the lock state to detachably engage the latch hole 65 (see FIG. 9).

Referring to FIGS. 1, 3 and 7, the retaining seat 70 is mounted on the upper plate 21 of the supporting frame 20 and includes a retaining plate 71, a rear plate 72, and a top plate 73. The retaining plate 71 is fixed onto the upper plate 21 of the supporting frame 20 and is formed with a through hole 711 that is aligned with the latch hole 65 in the up-down direction (Z). The rear plate 72 extends upwardly from a rear end of the retaining plate 71. The top plate 73 extends forwardly from a top end of the rear plate 72, and cooperates with the rear plate 72 and the retaining plate 71 to define thereamong a retaining space 74 that opens forwardly for retaining the cable guide device 50 when the cable guide device 50 is at the retracted position. The sliding bolt 63 extends through the through hole 711 to engage the latch hole 65 when the cable guide device 50 is at the retracted position and when the locking unit 6 is in the locked state.

In this embodiment, the retaining plate 71 is connected to the upper plate 21 by a plurality of screws 75 extending through the retaining plate 71 and the upper plate 21. In other embodiments, the retaining plate 71 may be secured on the upper plate 21 by welding, riveting, or the like and the present disclosure is not limited in this respect.

Figure 6:
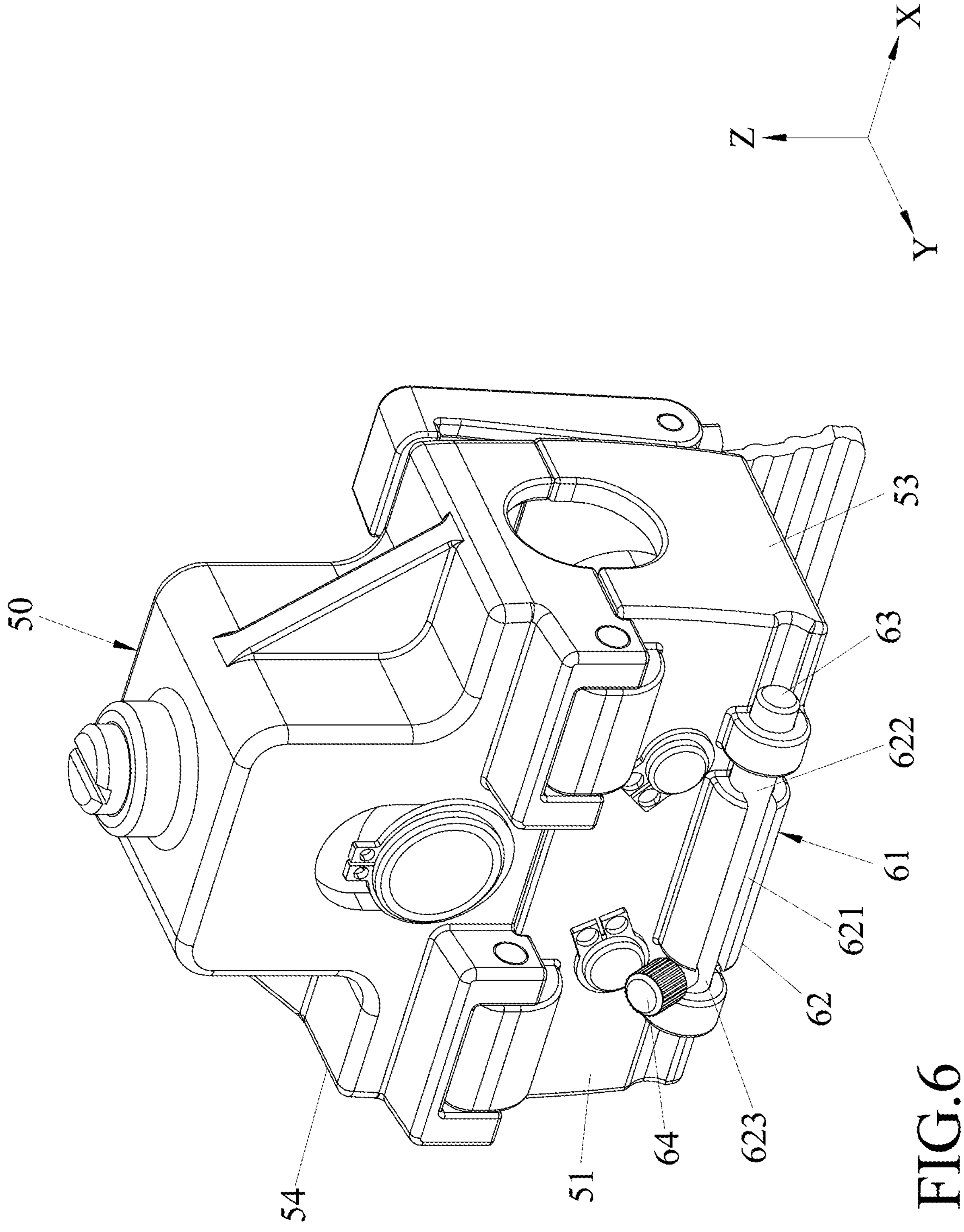
FIG. 6 is similar to FIG. 5, but illustrating the sliding bolt being entirely disposed within front and rear walls of the cable guide device.

As shown in FIG. 6, after winding of the cable 10 is completed and it is desired to move the cable guide device 50 to the retracted position, the grip piece 64 is first moved along the guide groove 621 into and engages the rear positioning groove 623 such that the locking unit 60 is in the unlocked state. At this position, the sliding bolt 63 is entirely disposed between the front wall 53 and the rear wall 54.

Then, the cable guide device 50 is moved leftwardly along the elongated rod 43 to be corresponding in position to the retaining seat 70. Afterwards, a rearward and upward external force is exerted on the connecting unit 40 so the left swing arm 41 and the right swing arm 42 pivot relative to the supporting frame 20 with the elongated rod 43 moving the cable guide device 50 rearwardly and upwardly to be disposed on the retaining plate 71 and the upper plate 21 of the supporting frame 20. In this way, the cable guide device 50 is received in the retaining space 74 of the retaining seat 70. Hereafter, the cable guide device 50 is rotated by 90 degrees from a position shown in FIG. 6 to a position show in FIG. 7. At this position, the sliding bolt 63 extends in the up-down direction (Z) and is aligned with the through hole 711 and the latch hole 65, and the grip piece 64 is rotated to disengage from the rear positioning groove 623 and is moved along the guide groove 621 to thereby drive the sliding bolt 63 to slide toward the upper plate 21 and to be inserted into the latch hole 65 via the through hole 711. Finally, the grip piece 64 is rotated again to engage the front positioning groove 622 to position the locking unit 6 in the lock state.

To move the cable guide device 50 from the retracted position to the deployed position, the grip piece 64 is rotated to disengage from the front positioning groove 622 and is moved along the guide groove 621 (see FIG. 9) to thereby drive the sliding bolt 63 to move away from the upper plate 21 and to disengage from the latch hole 65 and the through hole 711 so the locking unit 60 is moved to the unlock state (see FIG. 7). Hereafter, a forward and downward external force is exerted on the connecting unit 40 to drive the left swing arm 41 and the right swing arm 42 to pivot relative to the supporting frame 20 so the cable guide device 50 is moved to be in front of the supporting frame 20. Finally, the cable guide device 50 is rotated 90 degrees so the front-rear channel 56 extending in the front-rear direction (X) and permits the cable 10 to extend therethrough. It should be noted that the pivot movement of the left swing arm 41 and the right swing arm 42 is limited by the left stop block 271 and the right stop block 281, and the cable guide device 50 is positioned at the deployed position.

Through the above description, the effects and advantages of the cable guiding assembly of the present disclosure can be summarized as follows.

First, by virtue of the pivot movement of the connecting unit 40, the cable guide device 50 is driven to move between the deployed position, where the cable guide device 50 is disposed in front of the supporting frame 20, and the retracted position, where the cable guide device is disposed on top of the supporting frame 20 and received in the retaining space 74 of the retaining seat 70. In this way, the cable guide device 50 may be prevented from being damaged when not in use.

Second, since the pivot movement of the connecting unit 4 easily moves the cable guide device 50 between the deployed position and the retracted position, it is not required to detach the cable guide device 50 when not using the cable guide device 50, which is quite convenient.

Third, by virtue of the locking unit 60 that interconnects the supporting frame 20 and the cable guide device 50, the cable guide device 50 is secured to the supporting frame 20 when at the retracted position, and stability of the cable guide device 50 at the retracted position may be enhanced.

Fourth, since the retaining seat 70 is provided to receive the cable guide device 50 therein, the cable guide device 50 may be protected by the retaining seat 70 when at the retracted position. Additionally, wobbling of the cable guide device 50 is prevented during movement of a vehicle mounted with the cable guiding assembly of the present disclosure, thus probability of the cable guide device 50 being damaged may further be reduced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A cable guiding assembly adapted to be mounted to a winch and for extension of a cable therethrough, said cable guiding assembly comprising:
- a supporting frame;
- a roller unit including an upper roller and a lower roller that are rotatably mounted in said supporting frame, that extend in a left-right direction, that are spaced apart from each other, and that define a cable space therebetween adapted for extension of the cable therethrough;
- a connecting unit including
  - a left swing arm and a right swing arm that are spaced apart from each other in the left-right direction and that are pivotably connected to said supporting frame, and
  - an elongated rod that extends in the left-right direction and that is mounted between said left swing arm and said right swing arm; and
- a cable guide device mounted to and slidable along said elongated rod, and having
  - a left-right channel that extends in the left-right direction for extension of said elongated rod therethrough, and
  - a front-rear channel that extends through said cable guide device in a front-rear direction transverse to the left-right direction and that is adapted for the cable to extend therethrough;
- wherein pivot movement of said left swing arm and said right swing arm drives said cable guide device to move between an deployed position, where said cable guide device is disposed in front of said supporting frame, and a retracted position, where said cable guide device is disposed on top of said supporting frame.

2. The cable guiding assembly as claimed in claim 1, wherein:
- said cable guiding assembly further comprises a locking unit that is connected to said cable guide device; and
- when said cable guide device is at the retracted position, said locking unit is operable from an unlock state to a lock state to detachably engage said supporting frame so as to secure said cable guide device at the retracted position.

3. The cable guiding assembly as claimed in claim 2, wherein said locking unit has:
- a latch hole formed in said supporting frame; and
- a latch bolt mounted to said cable guide device and engaging removably said latch hole when said cable guide device is at the retracted position and when said locking unit is converted to the lock state.

4. The cable guiding assembly as claimed in claim 2, wherein:
- said supporting frame includes
  - an upper plate and a lower plate being elongated in the left-right direction and spaced apart from each other in an up-down direction that is transverse to the left-right direction and the front-rear direction,
  - a left rear plate and a right rear plate interconnecting said upper plate and said bottom plate, and spaced apart from each other in the left-right direction,
  - a left mounting plate and a right mounting plate extending respectively and forwardly from said left rear plate and said right rear plate, and
  - a left side plate and a right side plate extending respectively and downwardly from left and right ends of said upper plate;
- said cable guide device includes
  - a left wall and a right wall, said left-right channel extending through said left wall and said right wall, and
  - a front wall and a rear wall, said front-rear channel extending through said front wall and said rear wall; and
- said locking unit has
  - a latch hole formed in said upper plate of said supporting frame, and
  - a latch bolt including
    - a fastener seat that is mounted on said left wall of said cable guide device, and
    - a sliding bolt that is mounted to said fastener seat and that is slidable relative to said cable guide device;
- when said locking unit is in the unlock state, said sliding bolt is entirely disposed between said front wall and said rear wall; and
- when said cable guide device is at the retracted position, said sliding bolt is slidable from the unlock state to the lock state to detachably engage said latch hole.

5. The cable guiding assembly as claimed in claim 4, further comprising a retaining seat that is mounted on said upper plate of said supporting frame, and that includes:
- a retaining plate fixed onto said upper plate and formed with a through hole that is aligned with said latch hole of said locking unit in the up-down direction, said sliding bolt extending through said through hole to engage said latch hole when said cable guide device is at the retracted position and when said locking unit is in the locked state;
- a rear plate extending upwardly from a rear end of said retaining plate; and
- a top plate extending forwardly from a top end of said rear plate, and cooperating with said rear plate and said retaining plate to define thereamong a retaining space that opens forwardly for retaining said cable guide device when said cable guide device is at the retracted position.

6. The cable guiding assembly as claimed in claim 1, further comprising a retaining seat that is mounted on said supporting frame, and that defines a retaining space opening forwardly for retaining said cable guide device when said cable guide device is at the retracted position.

7. The cable guiding assembly as claimed in claim 6, wherein said retaining seat includes:
- a retaining plate fixed onto top of said supporting frame;
- a rear plate extending upwardly from a rear end of said retaining plate; and
- a top plate extending forwardly from a top end of said rear plate, and cooperating with said retaining plate and said rear plate to define said retaining space thereamong.

8. The cable guiding assembly as claimed in claim 1, wherein:
- said supporting frame includes
  - an upper plate and a lower plate being elongated in the left-right direction and spaced apart from each other in an up-down direction that is transverse to the left-right direction and the front-rear direction,
  - a left rear plate and a right rear plate interconnecting said upper plate and said lower plate, and spaced apart from each other in the left-right direction,
  - a left mounting plate and a right mounting plate extending respectively and forwardly from said left rear plate and said right rear plate, and a left side plate and a right side plate extending respectively and downwardly from left and right ends of said upper plate;

said left side plate has a left block distal from said upper plate and bent leftwardly;

said right side plate has a right block distal from said upper plate and bent rightwardly;

said left swing arm includes a left pivot portion pivoted to said left side plate, and a left free portion extending from said left pivot portion;

said right swing arm includes a right pivot portion pivoted to said right side plate and a right free portion extending from said right pivot portion;

said elongated rod is connected between said left free portion and said right free portion; and the pivot movement of said left swing arm and said right swing arm is limited by said left block and said right block.

9. The cable guiding assembly as claimed in claim 1, wherein:

said supporting frame includes an upper plate and a lower plate being elongated in the left-right direction and spaced apart from each other in an up-down direction that is transverse to the left-right direction and the front-rear direction, a left rear plate and a right rear plate interconnecting said upper plate and said lower plate, and spaced apart from each other in the left-right direction, a left mounting plate and a right mounting plate extending respectively and forwardly from said left rear plate and said right rear plate, and a left side plate and a right side plate extending respectively and downwardly from left and right ends of said upper plate; and said upper roller and said lower roller are mounted between said left mounting plate and said right mounting plate.

10. The cable guiding assembly as claimed in claim 9, wherein said roller unit further includes a left roller and a right roller extending in the up-down direction, mounted between said upper plate and said lower plate, and spaced apart from each other in the left-right direction.

* * * * *